United States Patent

Magee et al.

[11] Patent Number: 6,105,954
[45] Date of Patent: Aug. 22, 2000

[54] SHEET FEEDER FOR DIGITIZING SCANNER

[75] Inventors: Mark W. Magee, Derry, N.H.; Richard A. Loder, Tyngsboro, Mass.

[73] Assignee: Howtek, Inc., Hudson, N.H.

[21] Appl. No.: 08/950,725

[22] Filed: Oct. 15, 1997

[51] Int. Cl.[7] .................................................. B65H 5/00
[52] U.S. Cl. .................................. 271/10.03; 271/10.05; 271/10.11; 271/110; 271/119; 271/121; 271/127; 271/273; 271/902; 271/265.02; 358/496; 358/498
[58] Field of Search ........................ 358/498, 496; 271/4.03, 4.1, 10.03, 10.05, 10.11, 10.12, 110, 119, 121, 124, 126, 127, 225, 273, 902, 265.02

[56] References Cited

U.S. PATENT DOCUMENTS

| 4,475,128 | 10/1984 | Koumura | 258/496 |
|---|---|---|---|
| 5,103,322 | 4/1992 | Beck et al. | 358/496 |
| 5,131,648 | 7/1992 | Ito | 271/265.01 |
| 5,192,068 | 3/1993 | Parker et al. | 271/121 |
| 5,201,873 | 4/1993 | Kikuchi et al. | 271/127 |
| 5,358,230 | 10/1994 | Ikemori et al. | 271/119 |
| 5,461,492 | 10/1995 | Jones | 358/496 |
| 5,520,381 | 5/1996 | Lo et al. | 271/121 |
| 5,918,873 | 7/1999 | Saito et al. | 271/10.11 |
| 5,951,003 | 9/1999 | Nojima et al. | 271/121 |

FOREIGN PATENT DOCUMENTS

| 359128144A | 7/1984 | Japan | 271/10.11 |
|---|---|---|---|
| 405294497A | 11/1993 | Japan | 271/4.1 |

*Primary Examiner*—H. Grant Skaggs
*Attorney, Agent, or Firm*—Cesari and McKenna, LLP

[57] ABSTRACT

A sheet feeding mechanism for a digitizing scanner particularly adapted to feed transparent and translucent film sheets provides two pairs of feed rollers each located on an opposing side of the scanner camera's image line. A tray for supporting a feed stack is provided. The tray pivots into and out of engagement with a pick roll at predetermined times during the feed cycle. The pick roll rotates to feed the top sheet of the stack into the feed rollers. The top sheet must climb a curved stripper that resists downstream movement of the next sheets in the stack. A pair of edge sensors are located upstream of the upstream feed rollers and downstream of the downstream feed rollers. The sensors sense, respectively, the trail edge and the lead edge of the sheet, respectively and enable a central processing unit to automatically determine the length of the sheet. The sheet can, thereby, be reversed and scanned fully over its entire length. The sheet can be reversed and rescanned based upon the CPU's information about the sheet's length.

29 Claims, 14 Drawing Sheets

SHEET FEEDER FOR DIGITIZING SCANNER

FIELD OF THE INVENTION

This invention relates to an improved feeding mechanism for transferring sheets containing graphical and/or textual images through a digitizing scanner, and more particularly a feeding mechanism adapted to feed sheets from a stack of transparent and translucent film sheets.

BACKGROUND OF THE INVENTION

Electro-optical digitizing scanners are commonly employed as peripheral devices linked with microcomputers and other data processing and storage devices. Scanners enable graphical and text data to be accurately converted into stored digital data for further processing and interpretation, by, for example, a microcomputer. Scanners are adapted to read data from a variety of media and formats. Opaque and transparent sheets are two common forms of scanned media.

An image on a sheet is defined by light areas ("highlights") and dark areas ("shadows"). To convert the light and dark areas into corresponding image data, the scanner typically illuminates the sheet with a light source. In one form of scanner, the sheet moves relative to a stationary camera by one or more sets of feed rollers. The sheet is provided to the rollers manually by placement on a feed tray. In higher-volume applications, the sheet can be stripped from a stack of sheets by a singulator assembly. As the sheet moves relative to the camera, the camera "scans" the width of the illuminated image, converting the scanned portion of the image into a data signal. This scanned image is said to be "digitized" in that the image is converted into a data file stored in a digital format with information representative of discrete segments or "pixels." The data in the file includes instructions on how to assemble the individual pixels into a cohesive two-dimensional image that mirrors the original scanned image. The data file includes information on the intensity value for each pixel and its color, if applicable, or grayscale shade.

Digitizing scanners that feed sheets through a stationary scanner generally create a non-digitizable zone near the lead edge, the trail edge, or both. This results because a single pair of feed rollers are used to grip the sheet adjacent to either the upstream or downstream side of the camera's field of view or "image line." Since the camera relies upon a fairly constant feed rate to properly scan the image, the feed rollers must maintain contact with the sheet at all times during the scanning process. To maintain contact, the rollers must, first, grip the sheet at an edge. The area adjacent to this edge is, thus, largely unscannable because of the interfering diameter of the roller.

In addition, most scanner feed mechanisms are also unidirectional, lacking the ability to precisely reverse and rescan a sheet. Accordingly, a sheet must be removed and rescanned again if another scanning operation is desired, such as scanning a portion of the sheet at a different resolution, or scanning the detail along a grip edge.

The scanning of translucent sheets is desirable in the medical field, and presents particular challenges. In particular, there is a need to digitally store and reproduce diagnostic radiological films, commonly termed "X-rays." Most patient X-ray films, in fact, are produced in a "series" that can consist of six or more individual, interrelated X-rays. Hundreds, or even thousands, of X-ray films are produced daily by a large hospital. By electronically storing and indexing radiological images, they can be made available indefinitely without taking up valuable storage space. In addition, various specialized graphical processes and image enhancement techniques can be used in connection with stored X-ray images. Furthermore, scanned radiological data can be easily transmitted to practitioners at remote locations via electronic mail or facsimile. In all, the ability to accurately and reliably scan developed X-ray film images provides an important diagnostic tool for medical practitioners.

High-volume scanning is desirable in fields like radiology. Hand-feeding of individual films into the scanner is inefficient and wastes scarce medical resources. A feeder that automatically singulates and feeds films from a stack into the scanner is preferable. However, films are traditionally difficult to singulate. Substantial static charges are built up on films, causing them to cling to each other. Conventional singulating techniques, in which sheets are slid off the top of the stack and into the feed rollers, are often ineffective on film. Most singulators fail to reliably separate stacked film sheets from each other causing a multiplicity of adhered sheets to pass into the scanner at once.

It is, therefore, an object of this invention to provide a sheet feed mechanism for a digitizing scanner that enables accurate scanning of the entire sheet without loss of image detail along a grip edge. The mechanism should enable precise reversing of a sheet and rescanning when desired. The mechanism should reliably singulate and transfer transparent and translucent film sheets from a feed stack.

SUMMARY OF THE INVENTION

This invention provides a sheet feeding mechanism for a digitizing scanner that overcomes the disadvantages of the prior art, and enables effective singulation and feeding of transparent and translucent film sheets from a stack of such sheets. The mechanism employs two pairs of feed rollers, each pair defining a driving nip within a feed plane. Each pair of feed rollers is located on an opposing side of an image line defined by the field of view of the scanner camera element. By locating feed rollers on opposing sides of the image line, the sheet can be scanned over its full length without the need of a grip edge that is unscannable. A singulating mechanism employing a rotating pick roll assembly and a stripper for separating the top sheet from adjacent sheets is also provided.

According to a preferred embodiment, sheets are provided in a feed tray in the form of a stack. The feed tray is pivotally mounted and biased upwardly into engagement into the stack by a spring assembly. A pick roll assembly comprises a roller that engages a top sheet in the stack to drive the top sheet into the downstream feed rollers at predetermined times. A cam assembly is mounted coaxially with the pick roll assembly. The cam assembly rotates to move the tray downwardly, against the force of the spring assembly, between feeding cycles. The lead, downstream, edge of the stack confronts a stripper that can comprise a central rigid stripper and a flexible stripper that flanks the opposing sides of the rigid stripper. The rigid and flexible strippers are used in combination according to a preferred embodiment. According to an alternate embodiment(s), the rigid stripper or the flexible stripper can be used individually in a sheet feeding mechanism according to this invention. The rigid stripper comprises a plurality of sections. It is mounted to a feed ramp of the mechanism at a substantially flat lower section. According to one embodiment, the flat lower section is tilted on at an upstream-upwardly directed angle. The angle is approximately 7° according to one embodiment.

The lower section confronts the lowest sheets in the stack, and the angle serves to drive the lead edges of the lowest sheets downwardly, as they are driven forwardly by adhesion to the upper sheets. The upper sheets in the stack are located adjacent a middle section of the rigid stripper that is angled downstream, relative to the lower section. The angled middle section serves to guide upper sheets in the stack downwardly between feed cycles. The upper edge of the rigid stripper defines a top section that is curved in a downstream-upward direction. The top section is located relative to the top sheet so that only the top sheet can pass over the top section, and into the feed path. The next sheets in the stack are maintained in position by the resistance force of the top section, which is greater than the static adhesion and frictional forces exerted by the top sheet as it slides relative to the next sheet.

The flexible stripper comprises a pair of upstream-upwardly angled flaps, located adjacent each of the opposing widthwise side edges of the rigid stripper. The top edge of each of the flaps is approximately aligned with and parallel to the top edge of the rigid stripper. The flaps define three discrete folded sections. A base strip defines a first plane that is mounted to the feed ramp remote from the lead end of the stack. A second angled section extends upwardly in an upstream direction from the base strip. The second section engages the lead end of the stack. The second section defines an angle of approximately 25° relative to the base strip according to one embodiment. A third, top edge section extends upwardly and further upstream from the second section. This top edge section overlays the top sheet of the stack. It is disposed at an angle of approximately 10° relative to the second section. When a top sheet is driven from the stack, it causes the flaps to elastically bend downstream. The top edge section prevents the lead ends of lower sheets in the stack, that are driven downstream based upon adhesion (static and frictional adhesion, for example) to the top sheet, from entering the feed path. The top edge particularly assists in singulating the the top sheet in the stack. Additionally, a spring force induced in the flaps causes the flaps to urge the lower sheets downwardly and upstream once the top sheet has passed out of the stack and a clearance has been established between the pick roll and the stack by downward movement of the feed tray.

The feed rollers rotate simultaneously in response to a moving drive belt linked to a common drive motor. The motor can comprise a stepper motor that enables a central processing unit (CPU) to track the rotational position of the motor. When a sheet is fed from the pick roll assembly, the feed rollers are rotated at a predetermined scan rate prior to arrival of the lead edge of the sheet. The sheet is fed from the upstream roller pair to the downstream roller pair. The sheet eventually trips a lead edge sensor, located immediately downstream of the downstream rollers. The lead edge sensor signals the CPU to reverse the motor a predetermined distance to return the lead edge of the sheet to a location adjacent the image line. The CPU then instructs the motor to move forward again, and the image is scanned. A trail edge sensor, located upstream of the upstream rollers, eventually detects the passage of the trail edge and signals the CPU. The CPU derives the remaining length of sheet passing through the image line, and ends the scan after the remaining sheet passes therethrough, thus automatically scanning the length of the sheet without requiring an operator to enter a prior length value for the sheet. After scanning the sheet, it can be ejected by the downstream rollers, or stopped prior to ejection and reversed to perform a further scanning operation on the sheet. the sheet is eventually ejected into an exit tray and the next sheet is fed from the stack by the pick roll assembly.

The tray can include a resistance pad located in alignment with the pick roll on the tray according to a preferred embodiment. The pad is mounted in a recess in the tray at or near the downstream end of the tray. The pad surface is substantially flush with the surrounding supporting surface of the tray. The pad surface is elastomeric.

The size of the sheet can be determined by locating the sheet's lead and trail edges using corresponding lead and trail edge sensors located along the feed path. The CPU tracks the movement of the motor, knowing the relative location of the lead and trail edge compared to the motor's rotational position. The lead edge sensor locates the lead edge in an initial scan. The sheet is then reversed to the start of the scan position, and scanned to acquire image data. When the sheet is scanned for data, the CPU starts and ends the scan at the expected edge lines so that only the desired image is scanned. By providing additional scan coordinates (starting and ending points) to the CPU the scan can be further shortened so that only a region of interest within the edges is actually scanned.

In an alternate embodiment, the upstream idler roller can include an actuator that moves the idler roller into and out of contact with the upstream drive roller. The CPU instructs the actuator to force the idler roller into engagement with the drive roller when the sheet is ready to move out of contact with the downstream feed rollers, and is to be handled only by the upstream feed rollers. Accordingly, the sheet is not subjected to a driving force by both feed roller pairs for more than a short period of time. This minimizes the likelihood that the sheet will suffer damage since, if one drive roller has a diameter unequal to the other, the rollers will move at different rates, causing tension or slack in the sheet located therebetween.

BRIEF DESCRIPTION OF THE DRAWINGS

The foregoing and other object and advantages of the invention will become more clear with reference to the following detailed description as illustrated by the drawings, in which.

DETAILED DESCRIPTION

Figure 1:
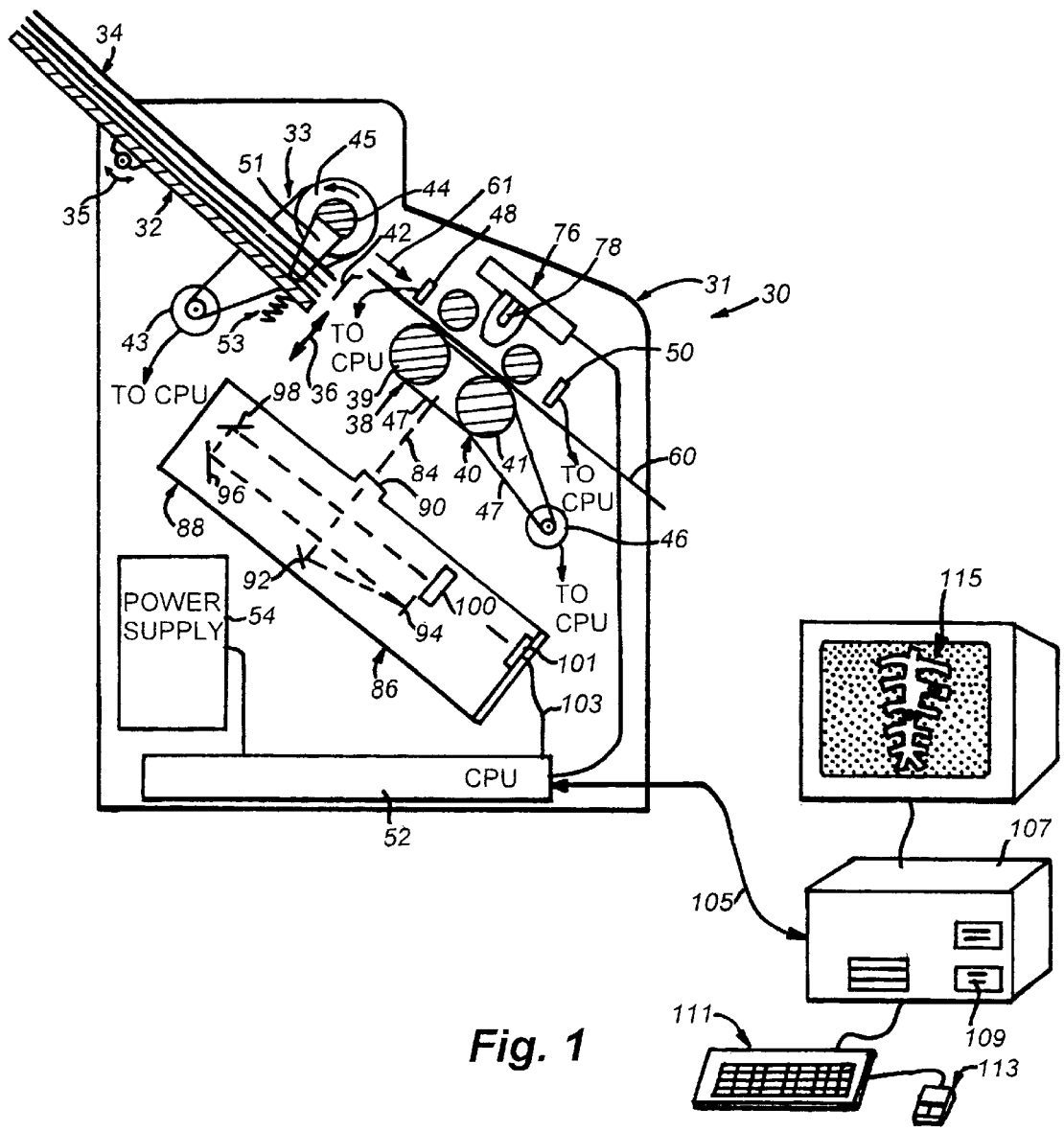
FIG. 1 is a schematic side cross-section and perspective view of a digitizing scanner system including a feed mechanism according to a preferred embodiment of this invention.

The scanner of this invention is shown in overall detail in FIG. 1. The scanner system 30 comprises an outer housing 31 constructed from metal, plastic or another acceptable, sturdy material that covers the system components. A more rigid internal frame structure (not shown) is employed to maintain alignment between components. Within the housing is mounted a feed tray 32 holding a plurality of sheets in a stack 34 in a preferred embodiment. The tray 32 moves upwardly and downwardly (double arrow 36) on a pivot 35 to feed sheets intermittently to two pairs of feed rollers 38 and 40. A stripper 42 and a pick roll assembly 44, in combination, singulate each uppermost sheet in the stack 34. A pick roll motor 43 is operatively connected to a drive pulley 45 of the pick roll assembly 44 by a pick roll belt 33. The pick roll assembly 44 includes a cam assembly 51 for biasing the tray 32 downwardly against the upward-pivotal biasing force of a spring assembly 53. The lower drive rollers 39 and 41, respectively of each feed roller pair 38 and 40 are driven by a central drive motor 46 and each individual drive roller is interconnected with, and driven by, the drive motor 46 by a series of belts 47 that can be conventional. The motor 46 can comprise a stepper motor that drives the rollers 39 and 41 in either a forward or reverse direction based upon a predetermined number of "steps" or rotational increments.

An upstream sensor 48 resides at the inlet of the upstream feed roller pair 38 and another, downstream sensor 50 resides at the outlet of the downstream feed roller pair 40. The upstream sensor 48 is also termed the "trail edge" sensor since it is used herein to sense passage of the trailing edge of a sheet therethrough. Likewise, the downstream sensor 50 is termed the "lead edge" sensor since it is used herein to sense the arrival of the lead edge to the sensor's position in the feed path. Each edge sensor 48 and 50 can comprise a conventional microswitch or electro-optical sensor having an output connected to the scanner's Central Processing Unit (CPU) 52. A more detailed description of the feed mechanism, which is the subject of this invention, is provided further below.

In general, the CPU 52 can comprise a variety of data processing and control capabilities including one or more microprocessors. The function of the CPU is described further below with reference to each individual component and its functions. Each operating component is, likewise, interconnected with the CPU by an appropriate analog, digital-serial or digital-parallel link. Power to the CPU and other components is provided by a power supply 54 that receives power from batteries an alternating current (AC) source or another acceptable electrical current source. The pick roll motor 43 and the central drive motor 46 are linked with the CPU 52, and receive speed, direction and on/off commands from the CPU. An exemplary sheet 60, which comprises a translucent developed X-ray film, is driven by the rollers 38 and 40, under control of the CPU 52 by the motor 46. The motor 46 is capable of both forward driving motion (arrow 61) and, opposing, rearward driving motion upon command. For the purposes of this description, the direction of the arrow 61 shall be termed the "downstream" direction, whereas the opposing direction is considered the "upstream" direction. With respect to sheets this direction is aligned with the "lengthwise" direction. The direction perpendicular to the lengthwise is termed the "widthwise" direction.

Figure 2:
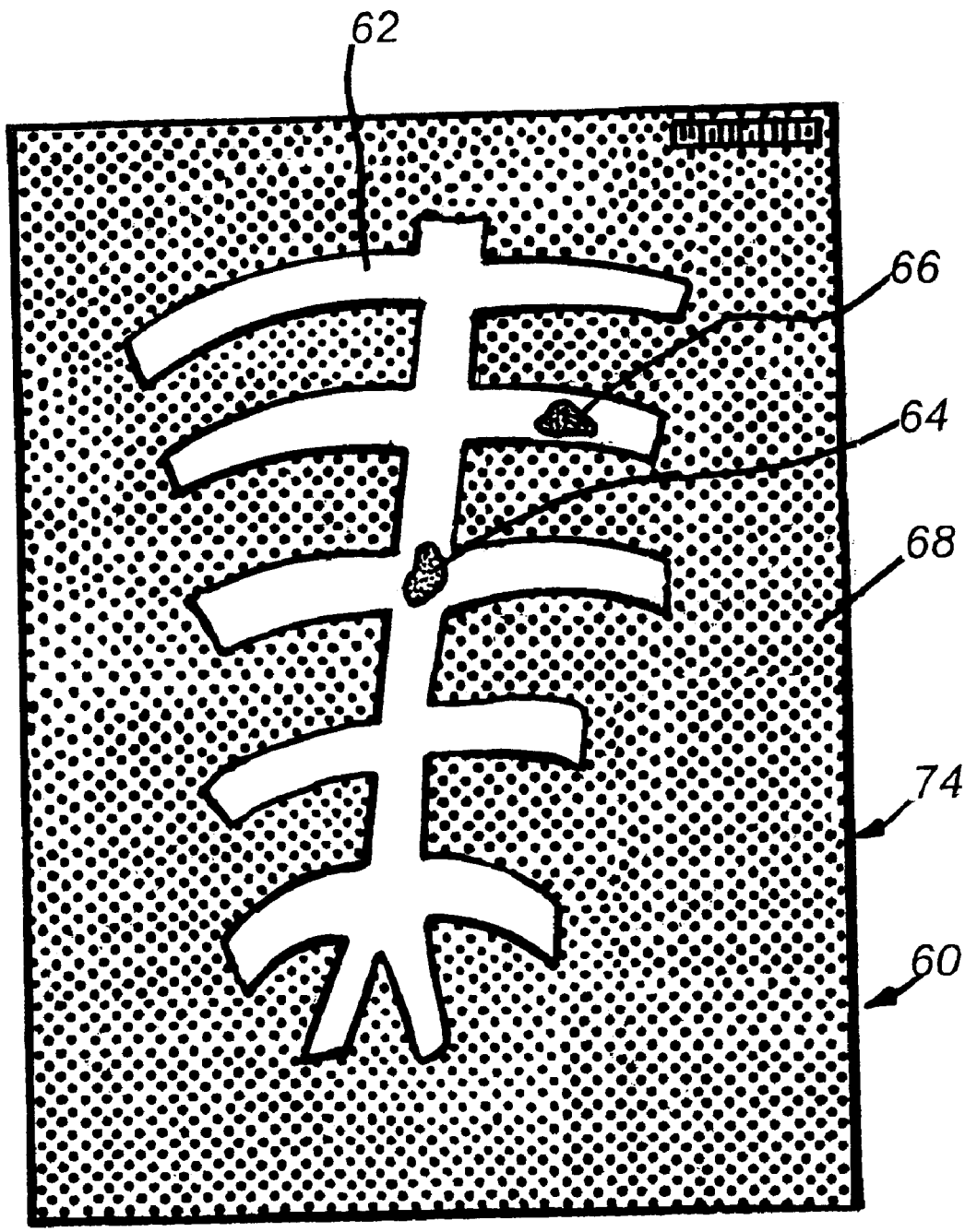
FIG. 2 is plan view of a developed X-ray film sheet for use with the digitizing scanner system of FIG. 1.

FIG. 2 illustrates generally the exemplary developed X-ray film sheet 60. A primary radiological image 62 is shown in the center of the sheet. The image 62 is largely transparent with various dark, opaque, inclusions 64 and 66 within its boundaries. In general, the surrounding background 68 is dark and mainly opaque. The background 68 typically extends outwardly to the perimeter edge 74 of the sheet 60.

With reference again to FIG. 1, the sheet 60 is illuminated by an illumination assembly 76. Illumination assembly 76 includes a light source 78. The light source can comprise any acceptable lighting element or elements such as a fluorescent bulb, an array of incandescent bulbs or a light emitting diode (LED) line array. Mirrors and diffusers can be used to modify the illumination light pattern where appropriate. Light from the illumination assembly 76 passes through the sheet 60 to be received by the camera assembly 86. While not shown, a transparent platen can be located between the sheet 60 and the camera assembly 86. The camera assembly 86 of this embodiment is enclosed in a rigid sheet metal enclosure 88. An elongated (taken in a direction perpendicular to the page of FIG. 1) window 90 enables the image light 84 passing through the sheet 60 to enter the camera assembly enclosure 88. The light is directed along an optical path by a series of mirrors 92, 94, 96 and 98, and through a focusing lens 100 to a CCD camera element 101. The CCD camera element 101 receives a line image that has been focused by the lens 100 to present a clear line image to a row of pixels extending across the width (taken in a direction perpendicular to the page of FIG. 1) of the scanner. Specifically, the CCD camera assembly includes a line of photosensitive pixels that each individually respond to light intensity with a corresponding electronic intensity signal. Data collected by the pixel line array CCD camera element 101 is transmitted through a data line 103 to the CPU 52 for processing. Any acceptable camera assembly can be used according to this invention. A camera with a different mirror arrangement and a different type of electro-optical image generating element can be substituted. Likewise the specific positioning of the camera assembly can be varied to suit the design requirements of the scanner.

Following a series of processing steps, the CPU transmits acquired image data over a communication line 105 to a microcomputer 107. The microcomputer 107 processes the image data according to known digitizing procedures and stores the image data in an appropriate data storage device such as a disk 109. Data can be manipulated using a user interface that can include a keyboard 111 and a mouse 113 and can be displayed on a monitor 115. Stored image can also be downloaded to other computers over a network or digitally reprinted using a telephone-connected facsimile machine.

Figure 3:
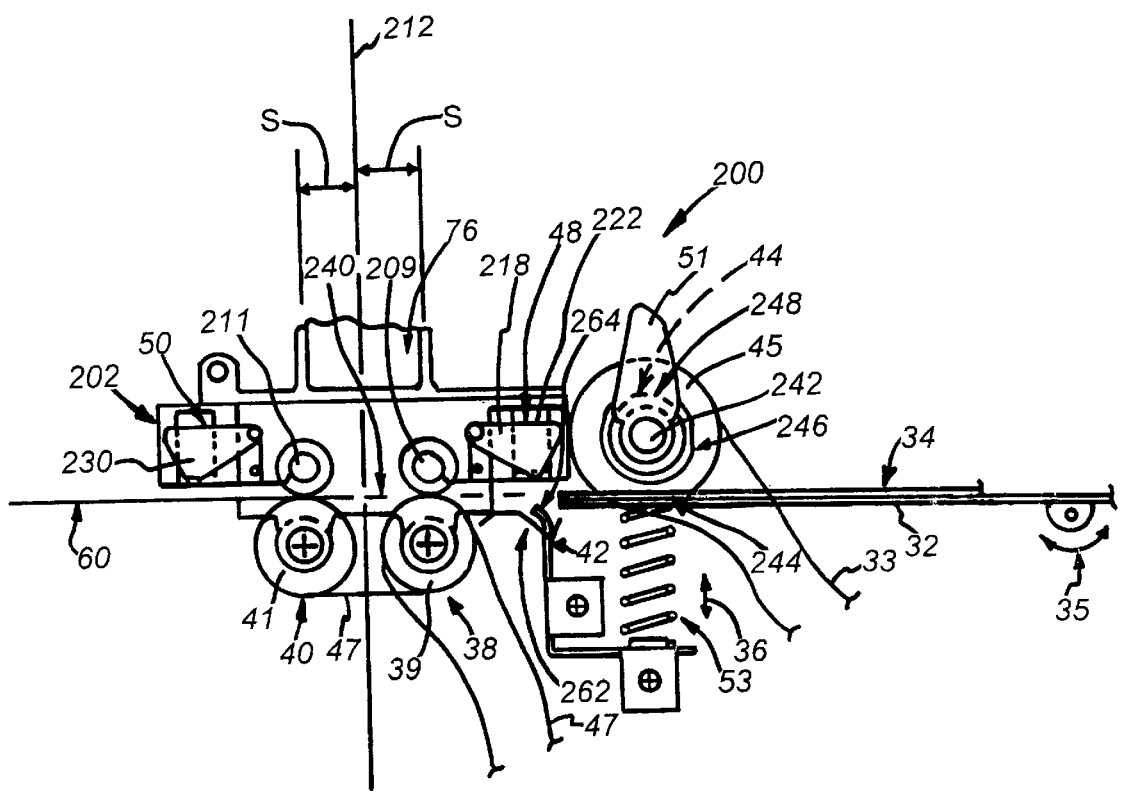
FIG. 3 is an exposed side view of the feed mechanism for the scanner system of FIG. 1.
Figure 4:
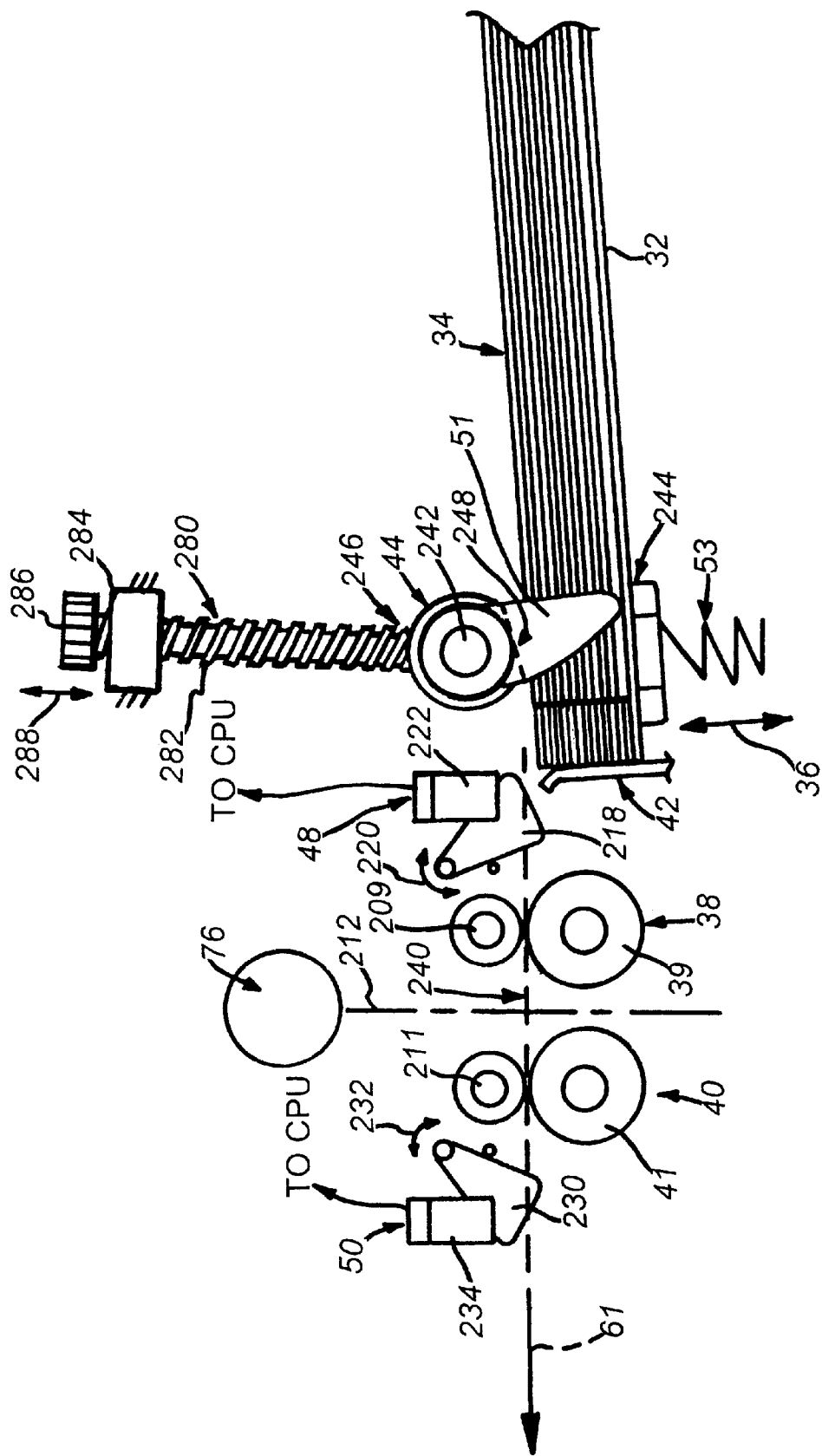
FIG. 4 is a schematic side view of the various components of the feed mechanism of FIG. 1.

FIGS. 3 and 4 show the feed mechanism 200 of the scanner system 30 in greater detail. The feed mechanism 200 is supported by a housing that can be constructed from metal, plastic and the like. The housing 202 can be formed as a casting or as a sheet-metal box structure. It is desirable that the housing support a plurality of axle shafts and shaft bearings to enable the components to rotate freely. The housing 202 in this embodiment receives the illumination assembly 76. The illumination assembly 76 can be mounted to the overall system housing 31 (FIG. 1) according to another embodiment of the invention.

The mechanism 200 includes two pairs of feed rollers 38 and 40. The roller pairs 38 and 40 each include a belt-driven (belts 47) drive roller 39 and 41 and a confronting idler roller 209 and 211. The idler rollers 209 and 211 freewheel relative to the housing, and are maintained in pressurable engagement with the drive rollers to form a driving nip by associated springs (see spring 215 in FIG. 5). The rollers each have an elastomeric surface that frictionally engages sheets passing through their nip to minimize slippage. According to a preferred embodiment the drive rollers 39 and 41 are 0.635 inch in diameter. The rollers are located at equal spacing on opposite sides of the camera's "image line" 212. The image line is the line that the camera "sees" as the image passes thereover. It is typically one camera pixel wide (0.00171 inch at the image plane according to a preferred embodiment). In particular the center of each drive roller 39, 41 and each idler roller 209, 211 is spaced by a spacing S (FIG. 3) equal to 0.42 inch from the image line 212 according to a preferred embodiment.

Upstream of the upstream roller pair 38 is positioned an electro-optical "trail edge" sensor 48. The trail edge sensor 48 includes a pivoting trip cam 218, that pivots (curved double-arrow 220 in FIG. 4) in response to movement of a sheet against the cam 218. The cam 218 moves into and out of an interfering position relative to an optical pick-up 222. The pick-up transmits an interruptable light beam to an electro-optical detector. When the beam is interrupted by the cam 218, a signal to the CPU indicates the presence of a sheet. Likewise, when the beam is not interrupted, the detector sends a sheet-absence signal to the CPU. Another "lead edge" sensor 50 is positioned downstream of the downstream roller pair 40. This sensor also trip cam 230 that pivots (curved double-arrow 232 in FIG. 4) in response to the passage of a sheet therethrough. A pick-up 234, likewise sends a sheet-presence/absence signal to the CPU. The upstream sensor 48 detects passage of a sheet approximately ½ inch upstream of the upstream roller pair 38, and the downstream sensor 50 detects passage of a sheet approximately ½ inch downstream of the downstream roller pair 40.

The stack support tray 32 is supported by a pivot 35 at its upstream end. The pivot enables the downstream-most end of the tray 32 to move upwardly and downwardly (double-arrow 36) with respect to the feed plane 240 (in phantom) defined by the nip of the rollers. The spring assembly 53 maintains the top sheet of the stack 34 in engagement with the pick roll assembly 44 by biasing the tray 32 toward the stack. As discussed briefly above, the tray is moved downwardly against the force of the spring assembly 53 in response to rotational movement of the elongated pick roll cam assembly 51, which is fixedly attached to the pick roll axle 242. According to a preferred embodiment, the spring assembly comprises one or more springs. When more than one sping is employed, each spring is located at a widthwise spacing from the other. The force exerted on the tray by the spring assembly is between approximately ½ and 2 pounds and is preferably ¾ pound. Also according to a preferred embodiment, the cam assembly 51 comprises two individual cams mounted on the pick roll axle 242 with the pick roll assembly 44 positioned therebetween. Specifically, the cams are positioned aside the opposing widthwise edges of the stack 34 so that the cams do not engage the stack as they rotate.

Rather, the cams engage portions of the tray 32 that extend outwardly in a widthwise direction further than the stack at engagement locations 244. In a preferred embodiment, the engagement locations 244 are adjacent to the springs of the spring assembly 53.

The pick roll assembly 44 defines a roller assembly with an elastomeric surface 246 that generates gripping friction for sliding top sheets off of the stack 34, and into the feed rollers 38 and 40. The surface elastomer can be silicone according to one embodiment. The surface 46 defines a D-shape with a reduced-radius flat 248 aligned with the cam assembly 51. The flat 248 is positioned so that the pick roll surface 246 is located out of interfering contact with the stack 34 when the cam assembly 51 biases the stack downwardly. The pick roll assembly can include two individual rollers each having a width of approximately 1½–2 inch, and spaced apart on the axle 242 by approximately 1 inch. The rollers are centered relative to the widthwise direction. Spacing and roller size are chosen to minimize the likelihood of sheet damage through frictional contact between the top sheet and adjacent sheets as the top sheet is slid relative to the stack. The geometry of the pick roll assembly 44 and the cam assembly 51 is described further below with reference to the operation of the feeder mechanism.

The stack's downstream or "lead" edge confronts the stripper 42 according to this invention. The stripper 42, and its component parts, are shown in greater detail in FIGS. 6–10. The stripper 42, according to a preferred embodiment comprises two main parts, including a rigid formed plate (the "rigid stripper" 251) constructed from sheet metal or an equivalent sturdy material such as plastic, and a semi-rigid, flexible formed sheet (the "flexible stripper 253) having a pair of flaps 255 that flank the widthwise edges of the rigid stripper 251 (see FIG. 6). It is expressly contemplated that the preferred stripper arrangement can comprise either the rigid stripper or flexible stripper taken alone according to an alternate embodiment. It has been determined that sheets can be effectively singulated by either the flexible or rigid stripper alone in many instances.

Figure 5:
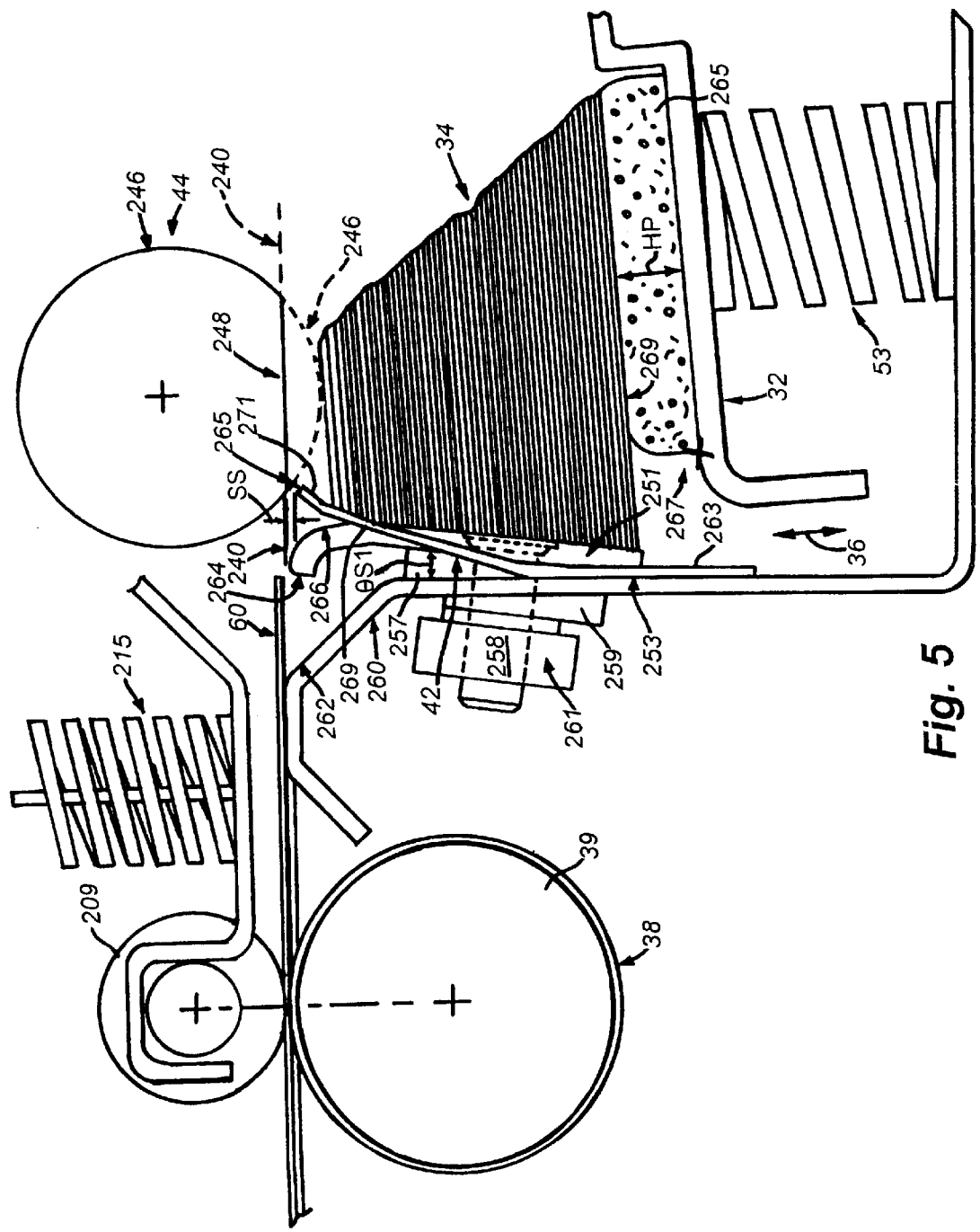
FIG. 5 is a partial side view of the feed mechanism of FIG. 3 detailing the feed path from the stack into the upstream feed roller pair.

According to the illustrated embodiment of the stripper 42, the rigid stripper 251 and the flexible stripper act concurrently to retain all sheets in the stack against movement into the feed path except the driven top sheet. Each stripper has a respective top edge that is positioned at approximately the same spacing SS below the feed plane 240 (FIG. 5). The spacing SS is approximately 0.020 inch according to a preferred embodiment. Each sheet must pass over both top edges to enter the feed path. The shape of the rigid and flexible strippers is arranged to permit only the top sheet to pass over the respective top edges. Despite the tendency of sheet-to-sheet adhesion to cause the lower sheets in the stack to follow the top sheet as it is driven out of the stack, the lower sheets are effectively blocked by the geometry of the rigid and flexible strippers. The lower sheets are, furthermore, urged back into the stack by the combined action of the rigid and flexible strippers. As noted the rigid and flexible strippers can be employed individually in an alternate embodiment(s). The specific structure and function of each stripper is now described.

Figure 6:
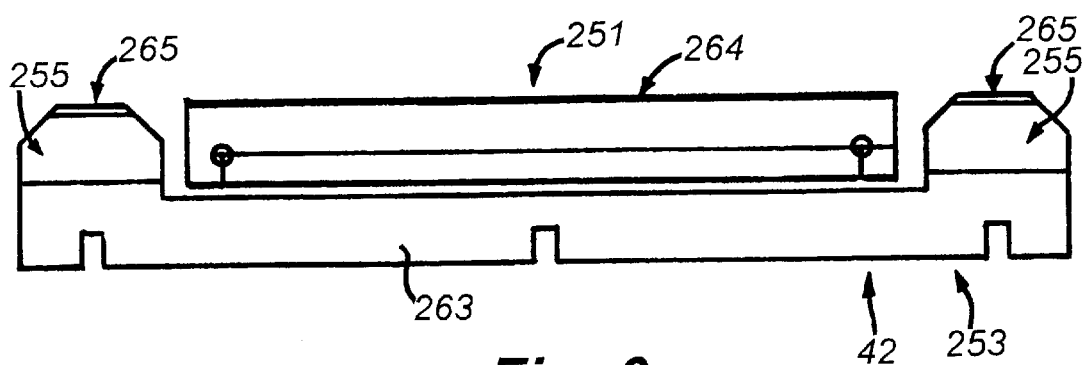
FIG. 6 is a front view of a sheet stripper for use with the feed mechanism of FIG. 3, having a rigid stripper component and a flexible stripper component according to an embodiment of this invention.
Figure 7:
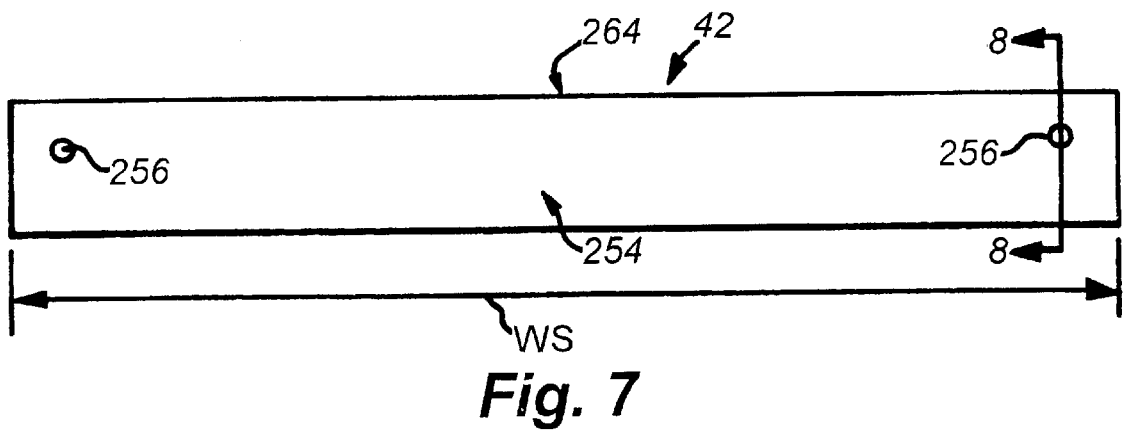
FIG. 7 is a more-detailed front view of the rigid stripper of the sheet stripper of FIG. 6.

With reference to FIG. 6, the rigid stripper 251 has a width WS of approximately 5 inches, centered relative to the operative width of the pick rolls and the feed tray 32. The rigid stripper 251 has a lower portion 254 that defines a flat mounting surface. The lower portion 254 includes mounting holes 256 arranged to receive fasteners 258 (shown in phantom in FIG. 5). The fasteners 258 secure the rigid stripper 251 to the feed ramp 260. The function of the feed ramp is described further below. Generally, the ramp 260 is part of the internal frame of the scanner. The ramp includes an angled feed surface 262 that extends upwardly from the rigid stripper's upper edge 264 into the feed plane 240.

Adjacent to the upper edge 264 of the rigid stripper 251 is a substantially flat middle section 266. The middle section extends across the width WS of the rigid stripper and has a height HM of approximately 0.070 inch. The middle section 266 is angled inwardly, toward the feed rollers 38, at an angle θS relative to the lower portion 254. The angle θS is approximately 15° according to a preferred embodiment. The function of the angled middle section 266 of the rigid stripper 251 is described further below.

Figure 8:
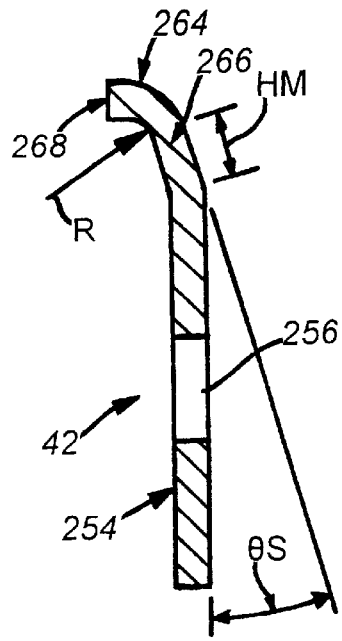
FIG. 8 is a side cross-section of the rigid stripper taken along line 8—8 of FIG. 7.
Figure 9:
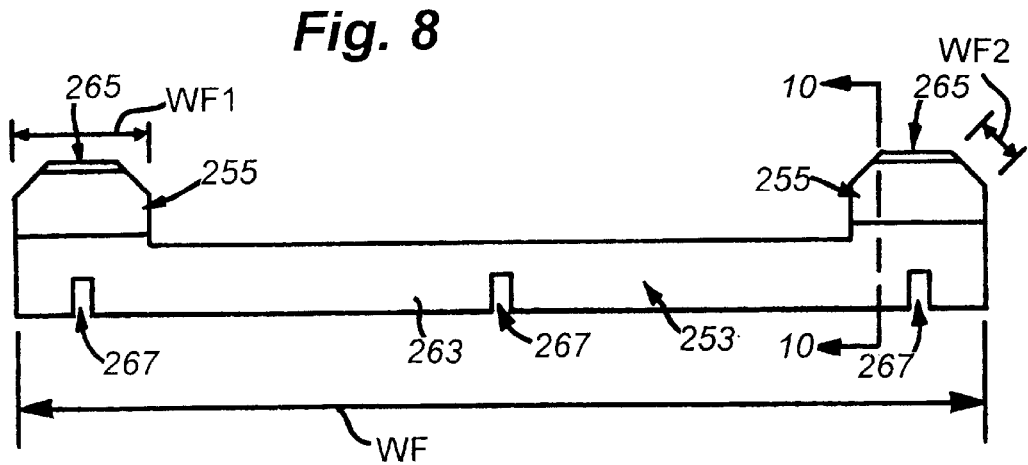
FIG. 9 is a more-detailed front view of the flexible stripper of the sheet stripper of FIG. 6.
Figure 10:
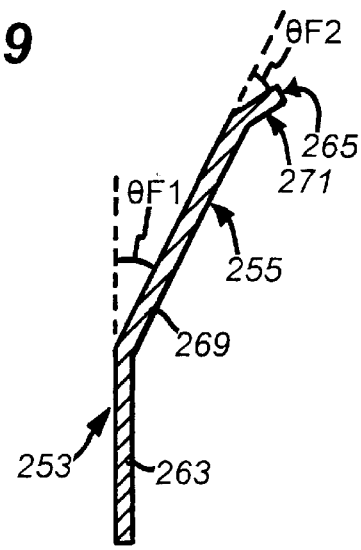
FIG. 10 is a side cross-section of the flexible stripper taken along line 10—10 of FIG. 9.

The top edge 264 of the rigid stripper 251 defines a continuous curve, extending toward the rollers 38, from the middle section 266 to an end point 268 (FIG. 8). At the end point 268, the rigid stripper's end extends perpendicularly to the lower portion 254. The average radius R of the curve is approximately 0.31 inch taken from the inside edge as shown.

The rigid stripper is attached to the feed ramp 260 at an angle θS1 of approximately 7° relative to the vertical plane of the feed ramp 260 (the plane being defined by the portion adjacent the fastener 258; also being substantially perpendicular to the feed plane 240). The flat lower surface 254 of the rigid stripper 251 is angled in the upstream direction as it rises upwardly toward the feed plane. This orientation causes lower sheets to undercut the rigid stripper, thus urging them downwardly into the main body of the stack 34. The angled middle section 266 and top edge 264 are oriented more-downstream as they rise upwardly. The top sheet is urged upwardly as it passes over these sections. The rise of the feed tray, as sheets are withdrawn causes the top sheet to remain adjacent the middle and upper sections of the rigid stripper. To generate the 7°-angle of the rigid stripper's lower section 254 relative to the feed ramp 260, a first wedge 257 is mounted between the rigid stripper 251 and the feed ramp 260. A conforming second wedge 259 is mounted on the opposite side of the feed ramp 260, and provides a level surface against which the securing nut and washer assembly 261 seats. According to another embodiment, the angle can be integrally provided to the ramp and/or rigid stripper, eliminating the need for wedges.

The flexible stripper 253 is constructed from a piece of semi-rigid material such as thin, resilient plastic sheet or MYLAR® that can be provided with a set of permanent folds, but that elastically deforms in response to pressures normally associated with the bearing of sheets thereon under the driving force of the pick roll 44. In this embodiment, the stripper has a thickness of approximately 0.012 inch. The flexible stripper is shown in greater detail in FIGS. 6, 9 and 10.

The overall width WF of the flexible stripper 253 is approximately 7.25 inches. A flap 255 having a width WF1 of approximately 1.0 inch is located on each opposing end of the flexible stripper with a base strip 263 located therebetween. The base strip is mounted to the feed ramp 260 using clips, screws or adhesive (not shown). A series of slots 267 are provided in the base strip 263 for mounting and clearance purposes. Each flap projects upwardly from the base strip 263 to a top edge 265 that, when mounted, is approximately parallel (with respect to the feed plane) to the top edge 264 of the rigid stripper 251 (see FIGS. 5 and 6). The top edge 265 of each flap 255 is chamfered at both edged with a 45° cutoff having a width WF2 of 0.25 inch, approximately.

The base strip 263 of the flexible stripper 253 is mounted flush against the feed ramp. As it rises toward the feed plane 240, it becomes angled upstream into the lead edge of the stack 34. As detailed particularly in FIG. 10, each flap 255 defines a flat base section strip 263. Rising from the base strip section 263 is a middle section 269 oriented at an angle θF1 relative to the plane of the base strip section. The angle θF1 equals approximately 15°. An upper edge section 271, likewise, rises at an angle of θF2 relative to the middle section 269. The angle θF2 equals approximately 10° relative to the plane of the middle section 269. The upper edge section 271 defines a significant upstream-upward angle that acts as a deflector to prevent the downstream edges of lower sheets from passing into the feed plane. The upper edge section can be approximately ⅛ inch in height. The two angled sections of the flexible stripper 253 can be formed by folding a flat piece of sheet material under heat and/or pressure in a former or mold to produce the desired arrangement of sections. The outline of the flexible stripper 253 can be produced by stamping or cutting before, during or after the folding process. Any acceptable forming process is expressly contemplated.

When sheets in the stack pass along the upper edge of the rigid stripper 251 their lead edges confront the angled middle and upper edge sections 269 and 271 respectively, of the flexible stripper 253. The middle and upper sections are elastically deformed (bent) in a downstream direction under the force of the sheets. The top sheet has sufficient force to deflect and pass over the top edge 265 of the flexible stripper in a bent state. The lower sheets, which may be driven downstream by adhesion forces are retained, in part, by the flexible stripper's angles middle and upper sections, which form a trap to prevent the lead edges from reaching the top edge 264 of the rigid stripper 251. When the flexible stripper is elastically deformed, the flaps 255 store spring energy as an upstream-directed reaction force bearing against the lead edge of the stack 34. Once the top sheet has passed out of the stack, the reaction force can bear fully on the upper sheets which are now free to move rearwardly, since the pick roll 44 no longer engages the stack 34. The spring force actively urges the upper sheets in the stack rearwardly and downwardly, against the lower section of the rigid stripper 251. Note that the flaps 255 of the flexible stripper 253 should be spaced from adjacent side edges if the rigid stripper 251 sufficiently to enable the flaps to move freely under bending force in the upstream-to-downstream direction. A clearance of a few thousandths of an inch therebetween is generally sufficient.

Having described the operative components of the feed mechanism, the operation of the feed mechanism is now described with reference to FIGS. 11–15, which detail the feeding of a sheet 60 from the stack 34 as a series of steps.

Figure 11:
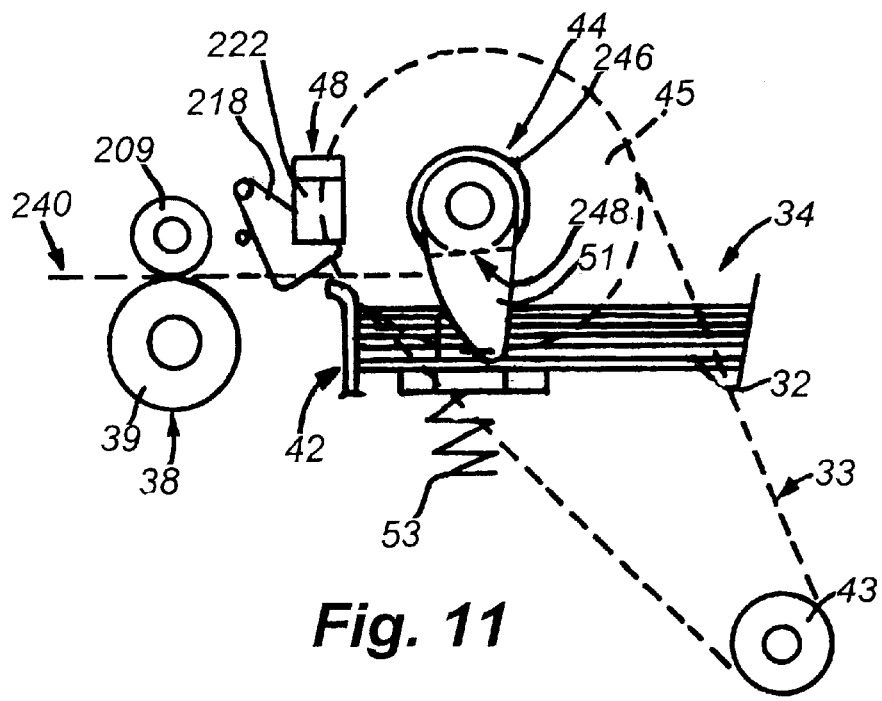
FIGS. 11–17 are schematic side views of the feeder mechanism of FIG. 3 detailing the feeding of a sheet from a sheet stack.

In FIG. 11 the cam assembly 51 is directed downwardly, biasing the tray 32 to its downward-most position. The length of the cams are chosen to move the thickest expected stack out of interfering contact with the pick roll surface 246. For a 50-sheet capacity tray, in which each sheet is approximately 0.01 inch thick, the cams must deflect the stack downwardly at least ½ inch. The top sheet 60 on the stack 34 faces the flat 248 on the pick roll surface 246, but is spaced from the surface by the action of the cam assembly 51. The flat 248 ensures that the surface 246 remains remote from the pick roll surface when the tray is fully loaded. A gap is thereby created that allows sheets to pass from the stack once they have become engaged by the feed rollers 38. This is described further below. One further advantage to maintaining the pick roll assembly 44 out of contact with the top sheet 60 of the stack 34 is that new sheets can be loaded atop the stack during scan cycles.

Figure 12:
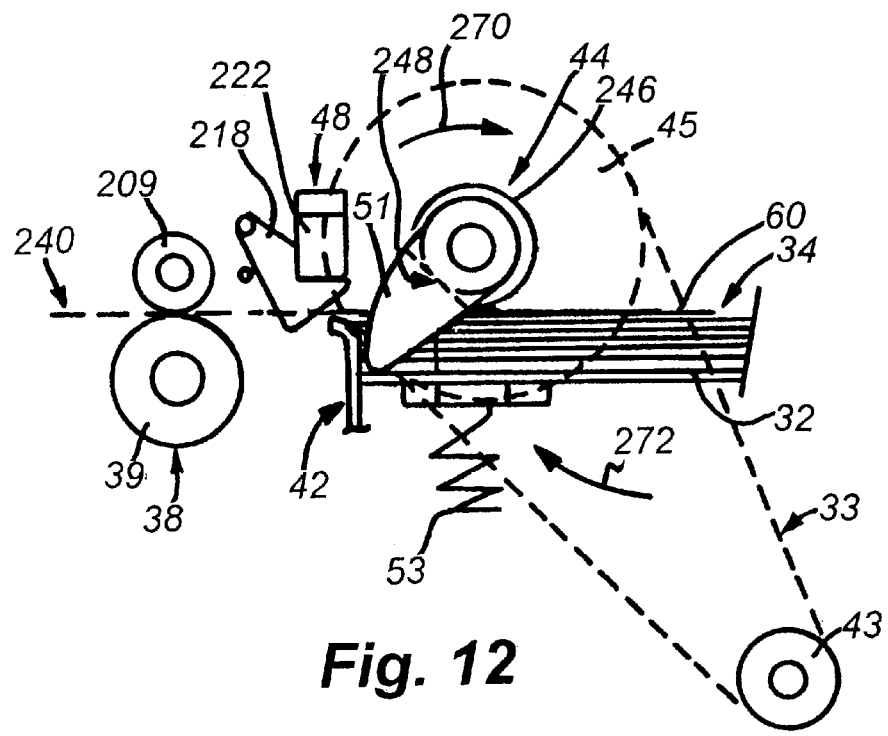

In FIG. 12, the cam assembly and pick roll surface 246 have rotated (curved arrow 270) based upon a movement of the pick roll motor 43. The motor 43 has received a movement command from the CPU, in conjunction with a scan command delivered to the scanner system from a microcomputer or another processing system. The speed of the motor 43 is controlled so that the tangential speed of the pick rolls approximately match the tangential speed of the drive roller 39. In fact, the pick roll assembly can be driven at a slight overspeed relative to each of the drive rollers to ensure positive feeding. As the pick roll assembly 44 rotates, the tray pivots (curved arrow 272) upwardly under the force of the spring assembly 53. The upward movement of the tray 32 brings the top sheet 60 into contact with the rotating pick roll surface 246. Note that the flat 248 has rotated away from the top sheet 60, and the top sheet now confronts the circular portion of the rotating pick roll surface 246. This begins the singulation of the top sheet from the stack. As further detailed in FIG. 5, the lead edges of the sheets in the stack 34 confront the stripper 42. The rigid stripper's top edge 264 acts as an obstacle over which the top sheet 60 must rise over to pass into the feed plane. As noted above, the top edge 264 of the rigid stripper 251 is located slightly below (0.020 inch) the feed plane 240. Likewise, the pick roll surface 246 is positioned so that the top sheet is slightly below the top edge 264. The stiffness of the lead edge of the top sheet 60 is sufficient to cause it to climb over the top edge 264, rather than folding downwardly into the stack 34. The positioning of the top sheet relative to the top edge is such that the sheet directly beneath the top sheet is blocked from passing the top edge in adherence with the top sheet. In other words, the resistance force exerted on the top sheet by the stripper is overcome by the pick roll surface 246, but the resistance force on the next sheet(s) in the stack exerted by the stripper 42 is not overcome by the frictional force exerted by the top sheet as it slides from the stack. The location of the stripper relative to the feed plane 240 can determine the relative resistance force exerted on the top sheet and next sheet(s) in the stack by the stripper 42. If the stripper is positioned too high relative to the feed plane, then all sheets, including the top sheet are effectively blocked from climbing the rigid stripper's top edge 264. Conversely, if the stripper is positioned too low relative to the feed plane, then several sheets may be able to climb over the top edge 264 of the stripper 42 at once with minimal resistance force exerted by the stripper.

The tray 32 as detailed in FIG. 5 includes an elastomeric pad 277 mounted in a recess 267 at the downstream end of the tray. The elastomeric pad has a height HP that locates its top surface 279 at approximately the same level as the top surface of the upstream portion of the tray. The width of the pad can be equal to the width of the pick roll. The recess can extend across the entire tray, as shown, or can comprise a centered indentation that is flanked by portions of the tray that are at full height. The pad 265 can be constructed from any resilient material.

In one embodiment the level of the tray assembly is preset. In an alternate embodiment, a basic adjustment mechanism 280 having a threaded shaft 282 and a corresponding threaded mount 284 is shown (FIG. 4). The mount 284 is attached to a fixed portion of the overall scanner system housing 31 (FIG. 1). Rotating the knob 286 causes the pick roll assembly 44 to move upwardly and downwardly (double arrow 288) relative to the feed plane 240. Likewise the position of the feed plane or the stripper can be adjusted using other adjustment devices (not shown). An adjustment mechanism enables differing thickness and stiffness sheets to be reliably singulated. The mechanism can be adjusted in increments until proper singulation is achieved.

As noted above, the angled flaps 255 of the flexible stripper 253 aid in realigning the lead edges of sheets that are lifted by frictional and static adhesion to the top sheet 60. When the adjacent upper sheets in the stack are lifted, they are driven downstream and upwardly until they are blocked by the curved top edge 246 of the rigid stripper 251 in combination with the upper edge section 271 of the flexible stripper 253. Once the top sheet 60 passes into the feed rollers 38, the next sheets in the stack 34 drop back down toward the tray under their own weight and the spring action of the flaps 255 of the flexible stripper 253.

Figure 13:
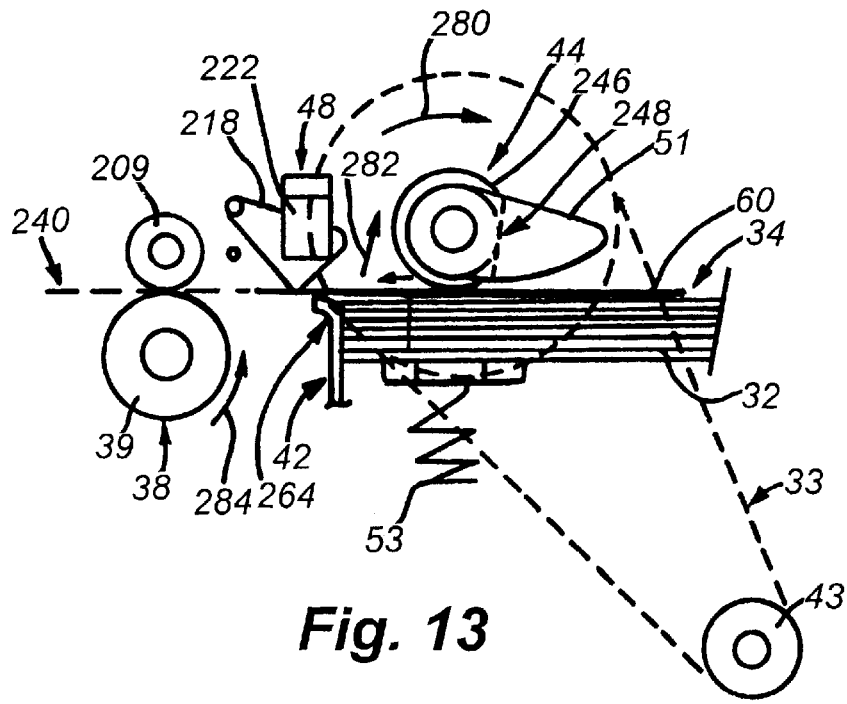

In FIG. 13 the top sheet 60 has been driven over the top edge 264 of the rigid stripper 251, and thence, into the feed plane 240. According to this embodiment, the both the rigid and flexible strippers 251 and 253 are mounted directly on the feed ramp 262 (see FIG. 5). The top sheet is directed upwardly along the ramp 216 into the plane 240. The pick roll assembly 44 continues its rotation (curved arrow 280) as the lead edge of the top sheet 60 engages the trip cam 218 of the sensor 48. The trip cam 218 is biased upwardly (curved arrow 282) by interfering contact with the top sheet 60. The CPU can use the passage of the sheet through the sensor 48 to signal the rollers 38 in one embodiment. However, in a preferred embodiment, the passage of the sheet through the sensor 48 does not specifically trigger an operation at this stage in the feeding process. Based upon a timing signal, having knowledge of the relative location of the top sheet's lead edge, the CPU can start the rotation (curved arrow 284) of the rollers 38 based upon a predetermined scan rate.

Figure 14:
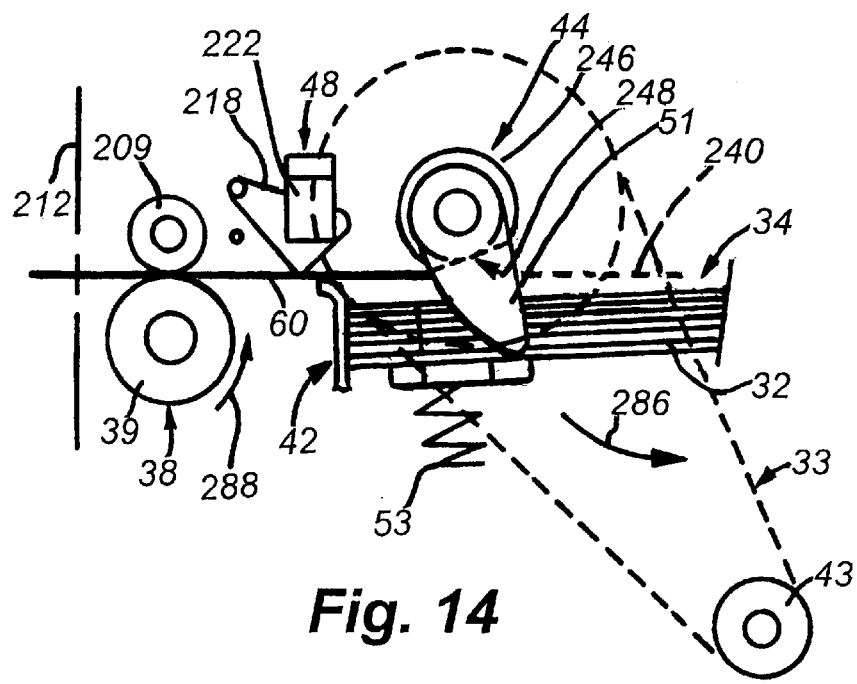

In FIG. 14 the rotation of the pick roll assembly 44 has ceased. The CPU has determined that the pick roll assembly has completed a full rotational cycle and is now in its stationary position. The cam assembly has now deflected (curved arrow 286) the tray 32 away from the pick roll assembly 44. As described above, the deflection of the tray, in combination with the pick roll flat 248 ensures that the sheet can pass fully from the stack under power of the feed rollers 38, without resistance from the now-stationary pick roll assembly 44. The pick roll motor 43 is a stepper motor according to a preferred embodiment, so the CPU can ensure a full cycle of rotation by counting "steps." In one embodiment, the motor or the pick roll assembly 44 also includes an encoder or other data acquisition device (not shown) for transmitting position data to the CPU. This encoder can be used to track the rotational movement of the pick roll generally, or the encoder can be used in conjunction with a stepper motor that provides basic regulation to the pick roll. Where the encoder is used with a stepper motor, the encoder can comprise a disk operatively connected with the motor. The disk has a single through-hole at a predetermined rotational location. When the pick roll rotates into a stationary position, the hole is aligned with a sensor and a light on the other side of the hole is received by the sensor. In this manner, the starting location for the pick roll assembly is the same after every cycle.

The top sheet 60 is now impinged by the upstream feed rollers 38, which have already begun rotating (curved arrow 288) to pass the sheet 60 across the image line 212. According to one embodiment, scanning can begin at a predetermined time after the rollers begin their rotation. In a preferred embodiment, the scanning process is forestalled until the sheet has proceeded into the downstream roller pair 40, and been reversed to an appropriate starting point. These steps in the feeding process are shown in FIGS. 15, 16 and 17.

Figure 15:
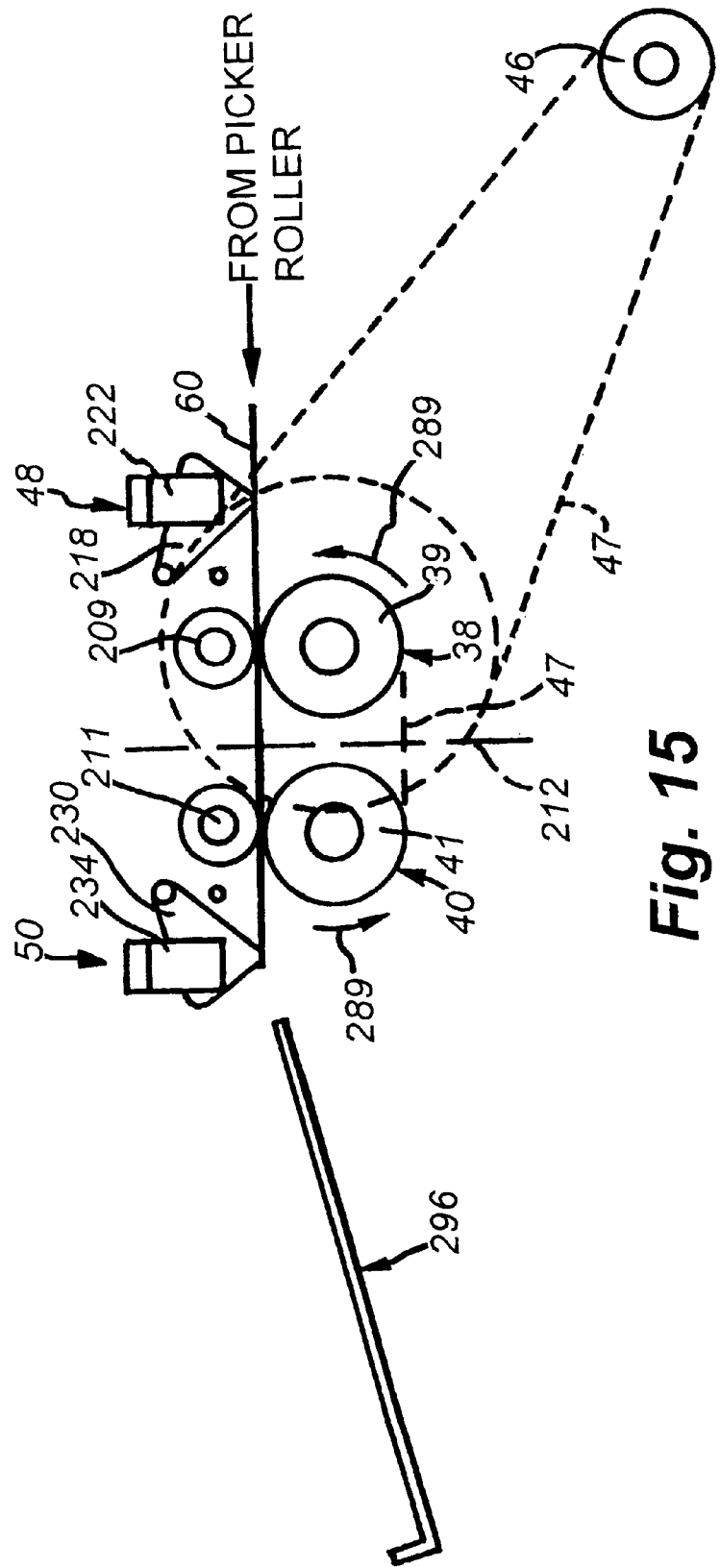

In FIG. 15 the top sheet 60 has passed out of the pick roll assembly 44, and is now driven by both pairs of rollers 38 and 40 in the downstream direction. The drive rollers 39 and 41 are rotated (curved arrows 289) in tandem by the belts 47. The lead edge of the sheet has engaged the trip cam 230 lead edge sensor 50, causing it to pivot upwardly (curved arrow 290). The electro-optical pickup 234 is triggered by the trip cam 230, signaling the CPU that a sheet lead edge is detected. The drive motor 46 is stopped by the CPU within a predetermined time after the lead edge signal is received.

Figure 16:
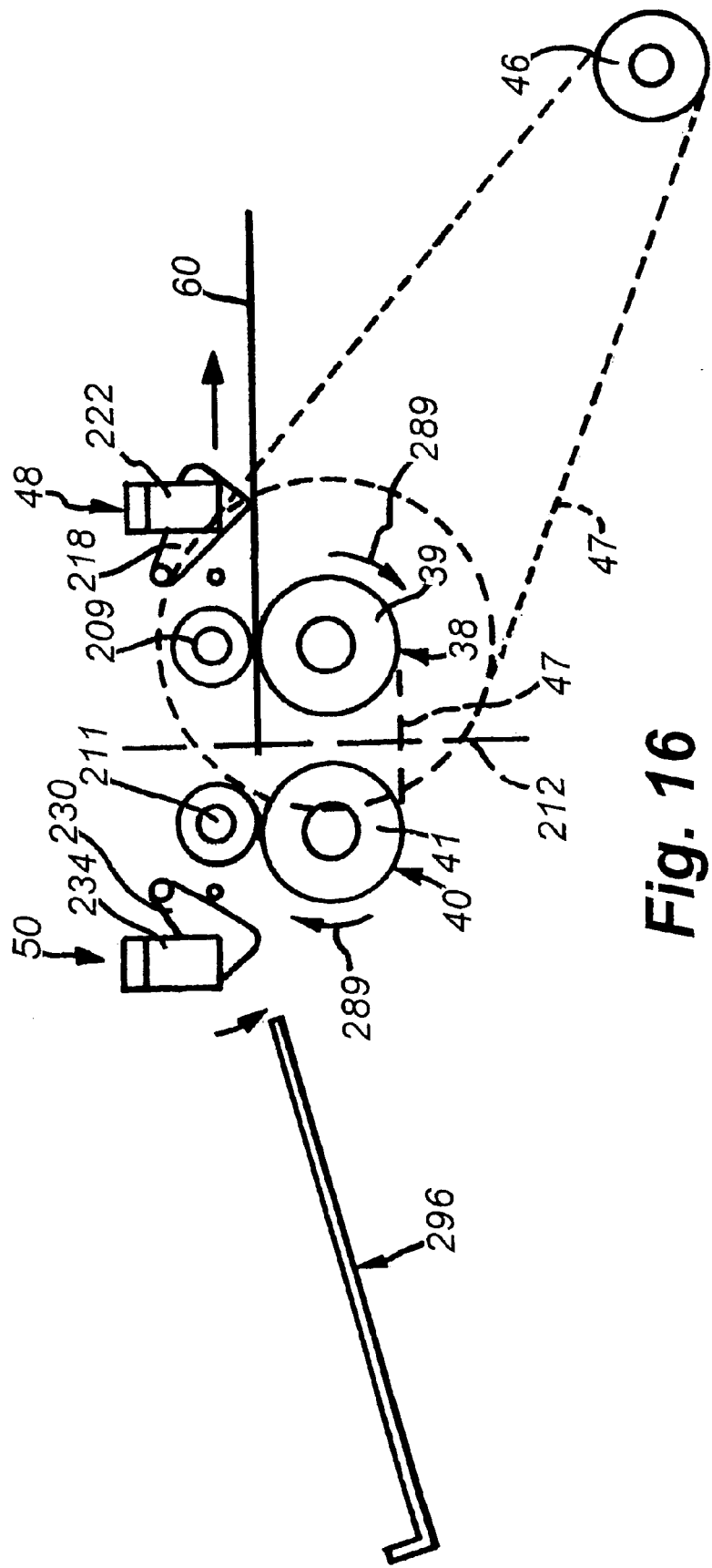

In FIG. 16 the top sheet 60 is reversed in the feed mechanism. The CPU can reverse the sheet by applying a predetermined number of reversing steps to the motor 46. These steps bring the sheet back to the a desired start point relative to the image line 212. Once the sheet is accurately positioned relative to the image line 212, the sheet can be driven forward again to begin scanning. Certain types of sheets, have margins (or other areas that do not require scanning) on the lead and/or trailing edges of predictable size. It is contemplated that the CPU can be programmed with the sheet's lengthwise margin sizes so that the motor 46 reverses the rollers 38 and 40 to position the sheet so that the inner margin border is approximately aligned with the image line 212. In this manner, the margin is not scanned, saving time and data storage capacity by scanning only a smaller region of interest within the boundaries of the larger sheet.

Figure 17:
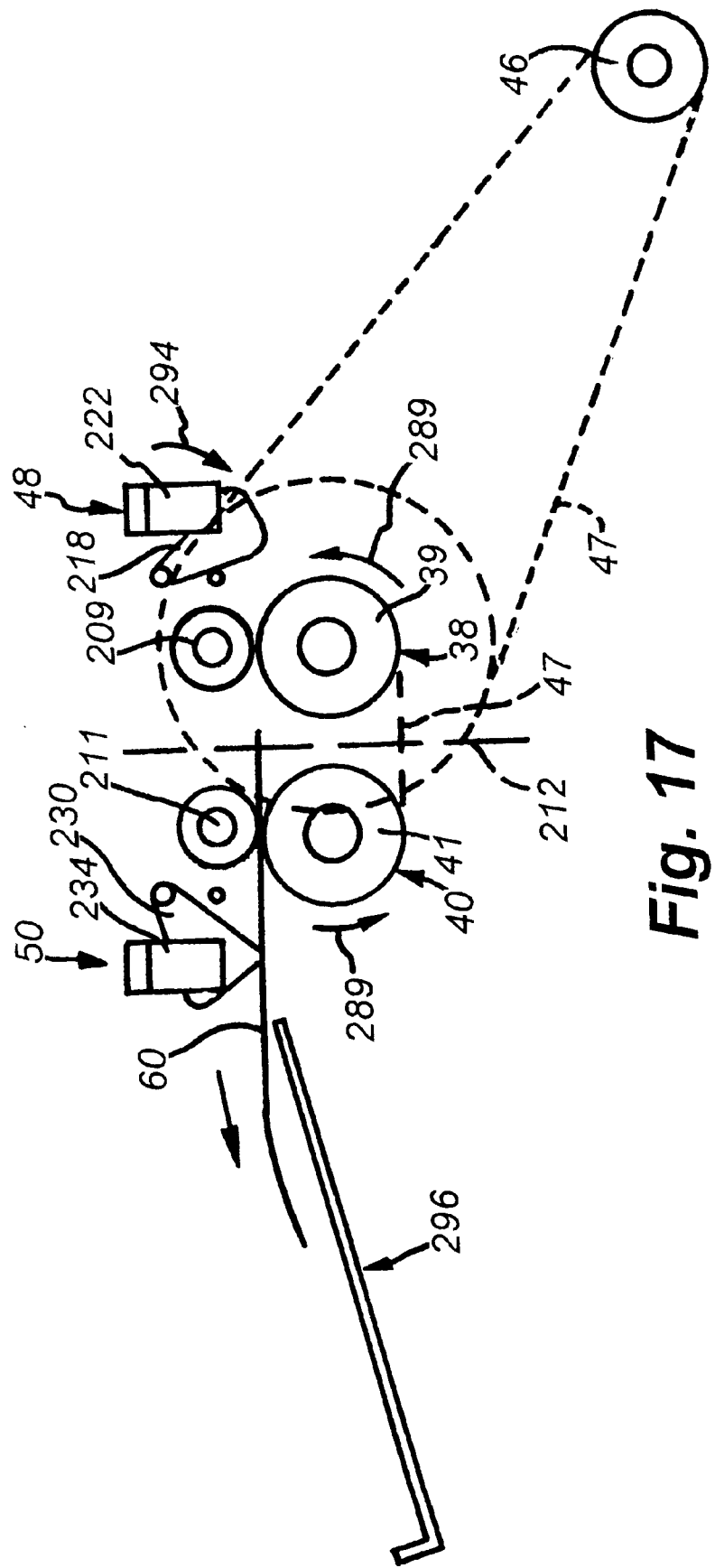

In FIG. 17, the top sheet 60 has passed through the trail edge sensor 48, causing the trip cam 218 to pivot (curved arrow 294) out of engagement with the electro-optical pick-up 222. An associated trail edge signal is transmitted to the CPU. The CPU marks the rotational location of the motor 46. The CPU knows the number of steps required to move from the sensor 48 to the image line 212. When that number of steps is counted out by the motor, the CPU ceases the scanning process since the trail edge has reached the image line 212. It is contemplated that the margin data described above can be used to deactivate the scan before the trail edge actually crosses the image line 212. The number of steps associated with the size of the margin is subtracted from the total number of steps required for the trail edge to reach the image line, and the scan is deactivated when the resulting number of steps is reached by the motor 46. After the sheet 60 crosses the image line, it can be drive from the downstream rollers 40 into an exit tray 296. Alternatively, the sheet can be reversed again, and further scanning operations can be performed. The CPU stores the locations of the sheet lead and trail edges relative to the rotational position of the motor 46, and controls the motor 46 based upon these positions during any subsequent scanning processes. When the sheet is completely scanned, it is ejected into the exit tray 296, and next top sheet is singulated from the stack 34 by the pick roll assembly 44. The series of process steps detailed in FIGS. 11–17 is repeated until all sheets in the stack 34 are exhausted or until a command to stop scanning is provided to the CPU by the operator.

It should be clear from the above description of the feeding process that the roller pairs 38 and 40 located on opposing sides of the image line 212, combined with sensors 48 and 50, enables ready and accurate size sensing and rescanning of sheets having a various lengths. The need to enter sheet length values in advance of feeding is largely eliminated. In addition, the need to refeed sheets to perform a rescanning operation is greatly reduced or eliminated. Further, the use of dual roller pairs enables full scanning of the length of the sheet from lead to trail edge due to the elimination of the need for an unscannable grip surface on the sheet.

When employing dual roller pairs on opposing sides of the image line according to this invention, it is desirable to maintain both drive rollers 39 and 41 at a substantially similar diameter. Since both rollers are driven in tandem by the belts 47, their tangential speed is controlled exclusively by their relative diameters. To match tangential speeds between the rollers, thereby reducing the likelihood of sheet damage through tearing or slippage, the roller diameters are closely matched. It is expressly contemplated that the rollers can be separately driven (not shown) in an alternate embodiment with appropriate controllers that match the rollers tangential speed. Alternatively, one or both of the rollers can include a differential (not shown) operatively connected to their connecting belt. If one roller is moving at a slower tangential speed than the other, then the differential equalizes the speed. Note that, in any embodiment, the maintenance of a predetermined scanning speed is desirable.

Figure 18:
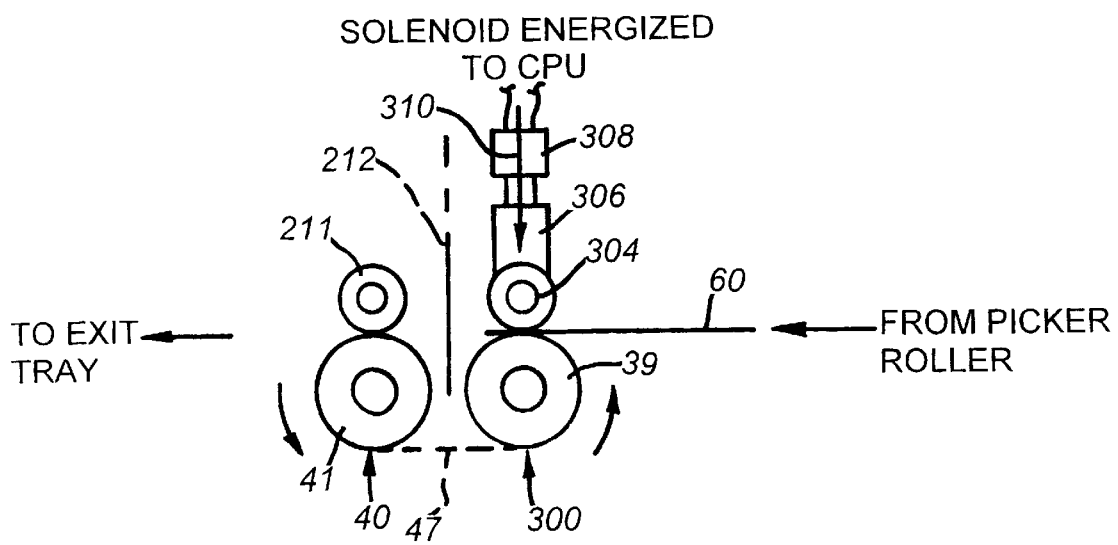
FIGS. 18–20 are schematic side views of a feed roller assembly for a feeder mechanism according to an alternate embodiment of this invention.
Figure 19:
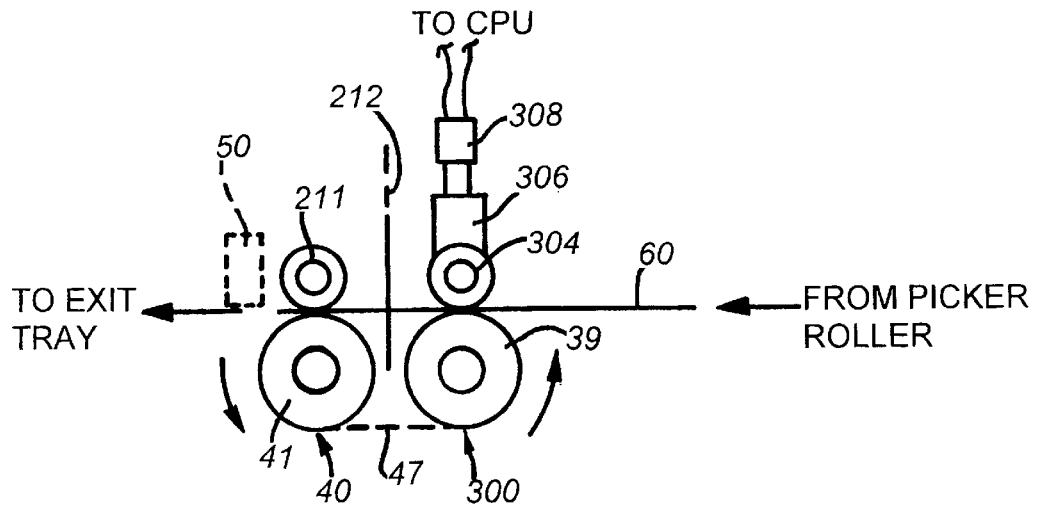
Figure 20:
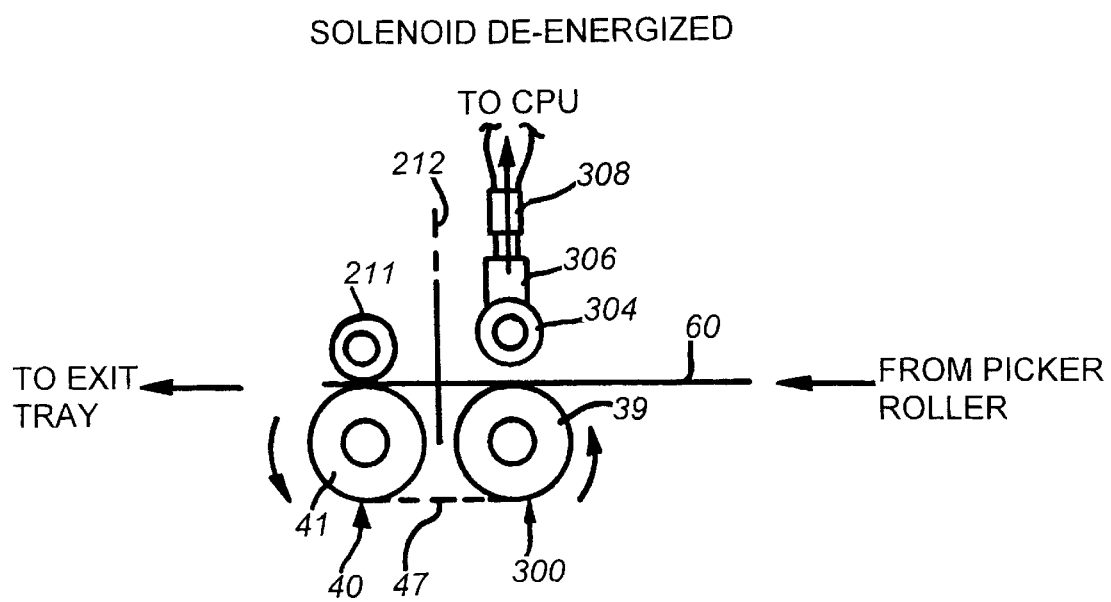

FIGS. 18–20 illustrate an apparatus and method for addressing a difference in tangential speed between the drive rollers on either side of the image line according to an alternate embodiment of the invention. Elements that are the same or substantially similar to those of the preceding embodiment are given like reference numerals.

In FIG. 15, a sheet is shown entering the scanning area of the mechanism. The upstream roller pair 300 comprises an unchanged drive roller 39, driven by the motor 46 as described above. The idler roller has been changed to include a movable bracket 306 and a linear actuator such as an electromagnetic solenoid 308. According to this embodiment the solenoid 308 is fixed, and the bracket 306 and idler roller 304 are movable into and out of engagement with the drive roller 39 by operation of the solenoid. The idler roller 304 freewheels relative to the bracket. When the solenoid brings the idler roller 304 into engagement with the drive roller 39, a sheet-driving nip is formed therebetween, exerting a tangential driving force on the sheet. Conversely, the drive roller 39 exerts minimal tangential driving force on the sheet when the idler roller is disengaged from it. Note that the bracket 306, or another component supporting the idler roller 304 can include a spring (not shown) for providing a predetermined biasing force to the idler roller when it engages the drive roller 39.

The solenoid 308 is operated between an engaged position (shown in FIG. 15) and a disengaged position (shown in FIG. 20 described further below) by a command of the CPU. A procedure is now described by which the CPU instructs the solenoid to operate.

In FIG. 18 the sheet 60 has entered the first roller pair 300 from the pick roll assembly. The solenoid is energized before the sheet enters the rollers 300 based upon a CPU command. The CPU has energized the solenoid to move the idler roller 304 downwardly (arrow 310) to engage the drive roller 39 at a predetermined time after the pick roll assembly begins singulating the sheet, and before the sheet lead edge is expected to reach the rollers 300.

In FIG. 19 sheet 60 has moved so that the downstream rollers 40 now also engage the sheet. The CPU counts the steps of the drive motor 46 to determine the approximate time in which the lead edge of a sheet requires to reach the downstream rollers. Alternatively, the lead edge sensor 50 (shown schematically in phantom in FIG. 19) is used to indicate passage of the sheet into the downstream rollers 40. A specific sensor (not shown), located directly adjacent the downstream rollers 40, can be employed to generate a sheet presence signal when the lead edge of the sheet 60 reaches the rollers 40.

When the sheet 60 reaches the downstream rollers, the CPU deenergizes the solenoid 308 to lift the upstream idler roller out of engagement with the drive roller 39. The sheet 60 is, thus driven only by the downstream rollers 40, minimizing potential problems associated with the feed rollers 300 and 40 operating at differing tangential speeds.

The solenoid 308 remains deenergized as the sheet 60 passes through the image line 212. The solenoid can be reenergized whenever the sheet is reversed so that the lead edge passes out of the downstream rollers 40. The relative position of the sheet can be tracked using the sheet position-detection techniques described in the preceding embodiment. For example the CPU can count steps to determine the relative location of the lead edge, or various sensors can be employed to determine the location of the lead edge.

The foregoing has been a detailed description of certain embodiments of the invention. Various modifications and additions can be made without departing from the spirit and scope of this invention. For example, the feed rollers can be arranged in an alternate pattern with drive rollers above idler rollers. Belts can be substituted for rollers and the word "roller," as used herein should be taken to include belts and other acceptable driving structures. These structures should allow the sheet to be engaged on both the upstream and downstream sides of the image line. Additional ramps and side guides can be provided to the feed mechanism. The capacity of the tray can be varied to suit the specific feeding application and additional conveyors can be provided at the upstream side and downstream side of the mechanism for transporting sheets to and from the scanner system. A sheet presence sensor can be provided to the tray. Based upon an empty tray signal generated by the sensor, the CPU can be instructed not to operate the pick roll assembly or feed rollers. In addition, the other components of the scanner system, such as the camera, CPU and illumination assembly can be altered or improved. While the idler roller is moveable out of contact with a fixed drive roller according to one embodiment of this invention, it is contemplated that the idler roller can be fixed, and the drive roller can be mounted on a movable support. Furthermore, while not shown, it is contemplated, according to a preferred embodiment that side guides can be provided to the feed tray the maintain sheets in a centered relationship within the feeding mechanism. The guides can be adapted to move in conjunction toward and away from each other along the widthwise direction using racks, pinions and the like, based upon well-known arrangements. Alternatively sheets can be registered against one of the widthwise side edges of the tray. Accordingly, this description is meant to be taken only by way of example, and not to otherwise limit the scope of this invention.

What is claimed is:

1. A sheet feeding mechanism for directing a sheet having an image thereon along a feed path in a lengthwise direction through an electro-optical scanner relative to a camera that scans successive lines of the image, the camera defining a scanning field of view along an image line oriented in a widthwise direction transverse to the lengthwise direction, the sheet entering the feeding mechanism from an upstream location and exiting the feeding mechanism to a downstream location, the sheet feeding mechanism comprising:

a first driven roller located on a first side of the image line adjacent the upstream location;

a second driven roller, located on a opposing second side of the image line adjacent the downstream location;

a drive for rotating each of the first driven roller and the second driven roller at a selected drive speed to direct the sheet in each of a downstream direction and an opposing upstream direction;

a first idler rotatably engaging the first driven roller to define a first drive nip therebetween;

a second idler rotatably engaging the second driven roller to define a second drive nip therebetween;

a lead edge sensor located in the feed path adjacent the second driven roller, being constructed and arranged to provide a signal indicating entry of a lead edge of the sheet thereinto; and a controller for controlling a rotation of the drive, the controller being interconnected with the lead edge sensor and the controller including a position determiner that derives a relative movement distance of the sheet along the feed path based upon an amount of rotation of the drive, the controller being constructed and arranged to operate the drive to selectively direct the sheet in each of the downstream direction and the upstream direction based upon a location of the lead edge, whereby the sheet is selectively moved upstream and downstream to locate the lead edge at desired locations along the feed path.

2. The sheet feeding mechanism as set forth in claim 1 further comprising a trail edge sensor located in the feed path adjacent the first driven roller, being constructed and arranged to provide a signal indicating exit of a trail edge of the sheet therefrom, the trail edge sensor being interconnected with the controller and wherein the controller includes a size determiner that derives a relative size of the sheet based upon each of the signal of the lead edge sensor and the signal of the trail edge sensor.

3. The sheet feeding mechanism as set forth in claim 2 wherein the drive includes a stepper motor and the position determiner derives a rotational position of the stepper motor based upon a number of movement steps of the stepper motor.

4. The sheet feeding mechanism as set forth in claim 2 wherein the upstream location comprises a stack tray and the sheets comprise film sheets, the film sheets being supported in a stack on the tray.

5. The sheet feeding mechanism as set forth in claim 4 further comprising a singulator assembly confronting a top sheet in the stack, the singulator assembly including a pick roll that rotates at selected times to direct sheets to the first driven roller.

6. The sheet feeding mechanism as set forth in claim 5 wherein the tray includes a movable mount so that the tray is movable to locate the top sheet into and out of engagement with the pick roll at selected times, the top sheet being in engagement with the pick roll to direct the sheet to the first driven roller and being out of engagement with the pick roll when the pick roll is stationary.

7. The sheet feeding mechanism as set forth in claim 6 wherein the tray includes a spring that biases the tray toward the pick roll and wherein the pick roll includes a driven axle and wherein the axle includes thereon a cam assembly that selectively engages the tray as the axle rotates to move the tray toward and away from the pick roll.

8. The sheet feeding mechanism as set forth in claim 6 wherein the pick roll includes an elastomeric surface having a flat along a portion of a perimeter of the surface, the flat confronting the top sheet, and being remote from the top sheet when the pick roll is stationary.

9. The sheet feeding mechanism as set forth in claim 5 further comprising a resistance pad located in a recess within a supporting surface of the tray and having a resistance surface substantially flush with the supporting surface of the tray, the resistance pad being positioned in alignment with the pick roll constructed and arranged to apply a frictional resistance force to a bottom sheet in the stack.

10. The sheet feeding mechanism as set forth in claim 5 wherein the singulator assembly includes a stripper located at a downstream end of the tray and confronting lead edges of each of the sheets in the stack, the stripper comprising a downstream-extended curved surface at an upper end, adjacent the feed path and a flat surface at a lower end, remote from the feed path, the curved surface being constructed and arranged so that the top sheet climbs the curved surface into the feed path as the pick roll rotates to drive the top sheet and so that the curved surface a resistance force that overcomes movement of adjacent, lower sheets in the stack into the feed path based upon adhesion to the top sheet as the top sheet is driven by the pick roll.

11. The sheet feeding mechanism as set forth in claim 10 wherein the stripper further comprises a downstream-angled surface located between the curved surface and the flat surface, the angled surface being oriented so that the lower sheets are directed, under force of gravity, downwardly toward the tray and upstream as their lead edges engage the angled surface.

12. The sheet feeding mechanism as set forth in claim 10 further comprising a feed ramp located downstream of the curved surface between an upper edge of the curved surface and the feed path for directing lead edge of the sheet into the feed path from the upper edge.

13. The sheet feeding mechanism as set forth in claim 5 further comprising a drive motor for rotating the pick roll, the drive motor being interconnected with the controller, the controller being constructed and arranged to rotate the pick roll through one revolution from a stationary rotational position back to the stationary rotational position and wherein the roller has a diameter constructed and arranged to move the lead edge from the stack into engagement with the first driven roller before the pick roll rotates the one revolution.

14. The sheet feeding mechanism as set forth in claim 1 wherein the first idler includes a mount that is selectively movable into and out of engagement with the first driven roller, the mount being interconnected with the controller.

15. A method for feeding a sheet through an electrooptical scanner along a feed path defined between an upstream location and a downstream location in a lengthwise direction that passes through an image line defined by a field of view of a camera oriented in a widthwise direction, transverse to the lengthwise direction, the method comprising the steps of:

providing a feed roller drive assembly that rotates a first feed roller assembly upstream of the image line and a second feed roller assembly downstream of the image line;

directing a sheet in a downstream direction into the first feed roller assembly from the upstream location and driving the sheet downstream through the image line;

receiving the sheet at the second feed roller assembly from the first feed roller assembly and driving the sheet;

sensing a position of a lead edge of the sheet and comparing the position with a relative rotational position of the drive assembly when the sheet is received at the second feed roller assembly;

directing the sheet in an upstream direction, subsequent to the step of receiving the sheet at the second feed roller assembly, until the lead edge is remote from the second feed roller assembly and upstream of the image line, including controlling the drive assembly based upon a current rotational position of the drive assembly;

directing the sheet in the downstream direction, subsequent to the step of directing the sheet in the upstream direction, including tracking movement of the lead edge based upon the first relative rotational position of the drive assembly; and operating the camera to scan the sheet when the lead edge is approximately adjacent the image line based upon the step of tracking movement of the lead edge.

16. The method as set forth in claim 15 wherein the step of receiving the sheet at the second feed roller assembly further comprises directing the sheet until a position of a trail edge of the sheet is sensed and comparing the position to a second relative rotational position of the drive assembly and deriving a size value for the sheet based upon each of the first relative rotational position and the second relative rotational position.

17. The method as set forth in claim 16 wherein the step of operating the camera includes tracking movement of the trail edge of the sheet as the sheet is scanned by the camera and deactivating the camera when the trail edge is approximately adjacent the image line based upon the step of tracking movement of the trail edge.

18. The method as set forth in claim 15 wherein the step of providing a drive assembly comprises providing a drive motor in rotatable engagement with each of the first feed roller assembly and the second feed roller assembly.

19. The method as set forth in claim 18 further comprising releasing a driving force exerted by the first feed roller assembly when the second feed roller assembly engages the sheet.

20. The method as set forth in claim 19 wherein the step of releasing comprises moving an idler of the first feed roller assembly to a position out of contact with a driven roller of the first feed roller assembly.

21. The method as set forth in claim 15 further comprising providing a stack of sheets at the upstream location and wherein the step of directing the sheet from the upstream location includes singulating the sheet from a top of the stack of sheets, the step of providing a stack further including providing a stack of film sheets.

22. The method as set forth in claim 21 wherein the step of singulating includes engaging the sheet with a rotating pick roll at a predetermined time.

23. The method as set forth in claim 22 wherein the step of engaging the sheet with a rotating pick roll includes moving a tray supporting the stack to a position more-adjacent the pick roll from a position more-remote from the pick roll.

24. The method as set forth in claim 23 wherein the step of moving the tray includes biasing the tray toward the pick roll with a spring and biasing the tray away from the pick roll with a rotating cam operatively connected to the pick roll.

25. The method as set forth in claim 22 wherein the step of singulating includes directing the sheet over a stripper having a curved surface that extends upwardly and downstream to an upper edge, including resisting movement of adjacent, lower sheets in the stack which are biased downstream based upon adhesion to the sheet.

26. A sheet feeder mechanism for a digitizing scanner adapted to generate image data from scanned translucent and transparent film sheets, the sheets being stored in a stack and delivered to a scanning location from the stack comprising:

a pick roll that rotates to direct a top sheet from the stack at a predetermined time in a downstream direction into a feed path through the scanner;

a stripper assembly that confronts a downstream end of the stack, the stripper assembly including a rigid stripper having a downstream-upwardly curved section terminating at a top edge, the top edge being located below the feed path, and the stripper assembly being constructed an arranged to enable the top sheet to pass upwardly over the top edge into the feed path and resisting downstream passage over the top edge of lower sheets in the stack that are adhered to the top sheet by static adhesion;

a flexible stripper located adjacent the rigid stripper and having a top edge approximately aligned with the top edge of the rigid stripper relative to the feed path, the flexible stripper having an upstream-upwardly angled upper section constructed and arranged to elastically bend in a downstream direction in response to passage of the top sheet over the top edge thereof and to apply a spring force to the lower sheets in the stack to force the lower sheets downwardly into the stack;

wherein the upstream-upwardly angled section comprises a first angled section remote from the top edge and a second angled section adjacent the top edge, wherein the second angled section is disposed at a further upstream-upward angle relative to the first angled section;

wherein the rigid stripper includes a substantially flat, planar lower section that confronts the lower sheets in the stack, the lower section being angled at a predetermined angle in an upstream-upward direction constructed and arranged to urge the lower sheets in the stack in a downward direction as the top sheet passes out of the stack; and wherein the upstream-upwardly angled section comprises a pair of flaps, each having a predetermined width located adjacent each of opposing widthwise side edges of the rigid stripper.

27. The sheet feeder mechanism as set forth in claim 26 wherein the predetermined angle is approximately 7°.

28. The sheet feeder as set forth in claim 26 further comprising a feed tray for supporting the stack, wherein the feed tray is movable toward and away from the pick roll to selectively move the stack into and out of engagement with the pick roll.

29. The sheet feeder mechanism as set forth in claim 28 further comprising a feed tray movement cam, operatively connected to, and rotated by, the pick roll, the cam selectively moving the tray toward and away from the pick toll based upon engagement of the cam with the tray.

* * * * *